(12) United States Patent
Waller et al.

(10) Patent No.: US 9,064,226 B2
(45) Date of Patent: Jun. 23, 2015

(54) SYSTEM AND METHOD FOR ORDER FULFILLMENT

(76) Inventors: Matthew S. Waller, Dallas, TX (US); John Stuart Fitts, Dallas, TX (US)

(*) Notice: Subject to any disclaimer, the term of this patent is extended or adjusted under 35 U.S.C. 154(b) by 1538 days.

(21) Appl. No.: 11/461,497

(22) Filed: Aug. 1, 2006

(65) Prior Publication Data
US 2008/0029595 A1 Feb. 7, 2008

(51) Int. Cl.
*G06Q 30/00* (2012.01)
*G06Q 10/08* (2012.01)
*G06Q 30/02* (2012.01)

(52) U.S. Cl.
CPC .......... *G06Q 10/087* (2013.01); *G06Q 30/0255* (2013.01)

(58) Field of Classification Search
USPC .................................... 705/26, 27, 26.1–27.2
See application file for complete search history.

(56) References Cited

U.S. PATENT DOCUMENTS

| | | | |
|---|---|---|---|
| 4,073,368 A | 2/1978 | Mustapick | 186/1 |
| 5,158,155 A | 10/1992 | Domain et al. | 186/53 |
| 5,186,281 A | 2/1993 | Jenkins | 186/55 |
| 5,482,139 A | 1/1996 | Rivalto | 186/36 |
| 6,073,840 A | 6/2000 | Marion | 235/381 |
| 6,574,603 B1 | 6/2003 | Dickson et al. | 705/1 |
| 6,688,435 B1 | 2/2004 | Will et al. | 186/35 |
| 6,813,609 B2 | 11/2004 | Wilson | 705/14 |
| 7,124,100 B2 * | 10/2006 | Pirillo | 705/7.29 |
| 2002/0046117 A1 | 4/2002 | Marion | 705/14 |
| 2002/0120520 A1 | 8/2002 | Hill | 705/26 |
| 2002/0143623 A1 | 10/2002 | Dayley | 705/14 |
| 2002/0178073 A1 * | 11/2002 | Gravelle | 705/26 |
| 2003/0149585 A1 | 8/2003 | Foster et al. | 705/1 |
| 2003/0177072 A1 * | 9/2003 | Bared | 705/26 |
| 2004/0026176 A1 * | 2/2004 | Quinlan | 186/53 |
| 2004/0035644 A1 | 2/2004 | Ford et al. | 186/41 |
| 2004/0249497 A1 * | 12/2004 | Saigh et al. | 700/216 |
| 2004/0254861 A1 | 12/2004 | Pentel | 705/27 |
| 2005/0049914 A1 * | 3/2005 | Parish | 705/14 |
| 2007/0007331 A1 * | 1/2007 | Jasper et al. | 235/379 |
| 2008/0004951 A1 * | 1/2008 | Huang et al. | 705/14 |
| 2010/0293051 A1 * | 11/2010 | Ramer et al. | 705/14.46 |

OTHER PUBLICATIONS

"Buying center research and business marketing practice: meeting the challenge of dynamic marketing" GGhingold, Morry; Wilson, David T. The Journal of Business & Industrial Marketing, vol. 13, issue 2, pp. 96-108, United Kingdom, 1998. Retrieved via ProQuest on Feb. 9, 2015.*

* cited by examiner

Primary Examiner — Michael Misiaszek
(74) Attorney, Agent, or Firm — Baker Botts L.L.P.

(57) ABSTRACT

A system and method for order fulfillment includes receiving an order for a plurality of items, initiating collection of the plurality of items for the order, detecting presence of a user at a selected one of a plurality of delivery locations when the plurality of items are ready for delivery, and initiating delivery of the items to the user at the selected delivery location.

22 Claims, 3 Drawing Sheets

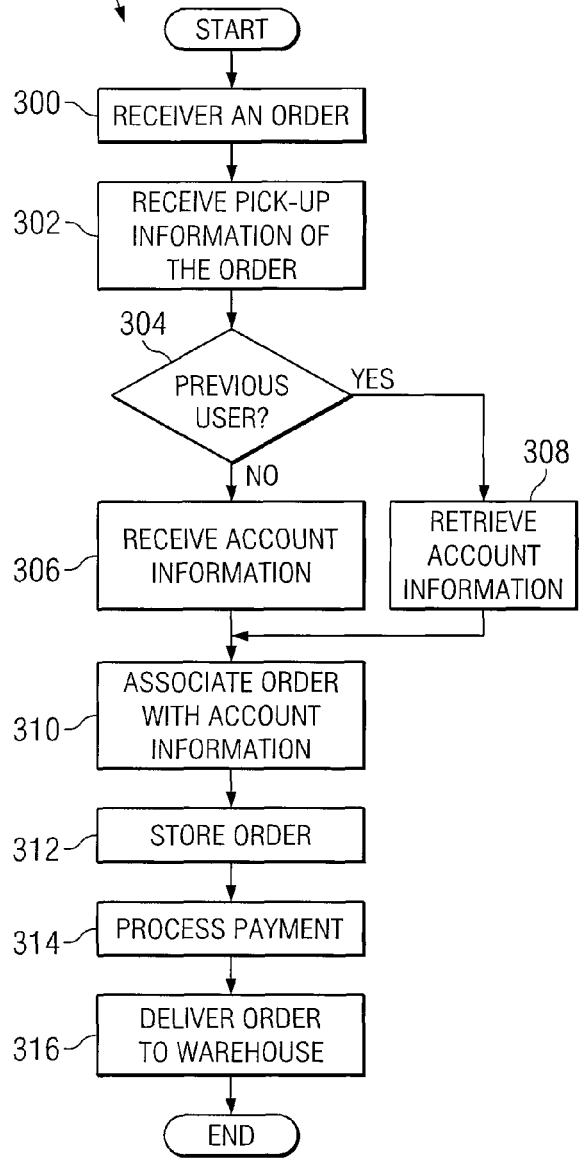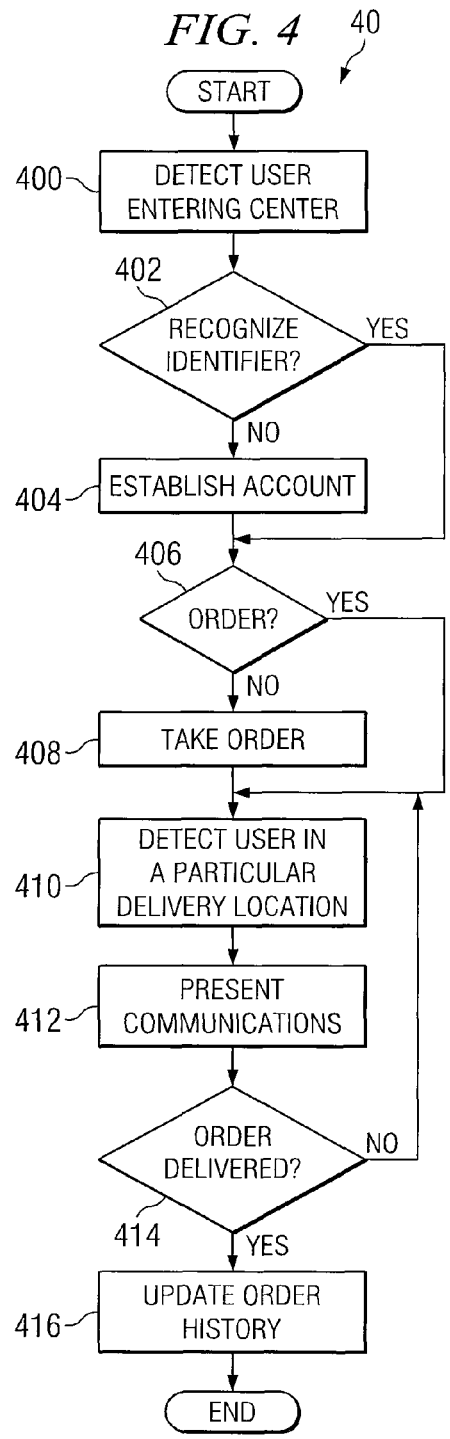

SYSTEM AND METHOD FOR ORDER FULFILLMENT

TECHNICAL FIELD OF THE INVENTION

This invention relates generally to the field of commerce and more particularly, to a system and method for order fulfillment.

BACKGROUND

Grocery stores, supercenters, and other fulfillment centers allow users to shop inside the centers to purchase items. As centers expand in size, users spend more time in the center purchasing items. Additionally, larger centers located farther from established residential areas require a longer commute to and from the center. The user's time also increases because parking lot sizes increase, which requires more walking to and from the store and exposes the user to crime and other elements. Therefore, current fulfillment centers result in decreased convenience, speed, and safety for the user.

SUMMARY OF THE DISCLOSURE

In accordance with the present invention, disadvantages and problems associated with fulfilling orders may be reduced or eliminated.

According to one embodiment of the present invention, a system and method for order fulfillment includes receiving an order for a plurality of items, initiating collection of the plurality of items for the order, detecting presence of a user at a selected one of a plurality of delivery locations when the plurality of items are ready for delivery, and initiating delivery of the items to the user at the selected delivery location.

Certain embodiments of the invention may provide one or more technical advantages. A technical advantage of one embodiment includes a system and method that provides for fulfilling orders quickly and efficiently. In a particular embodiment, the user remains in a vehicle during the order fulfillment process. The system accommodates a variety of user order input functions and a vehicle queue management technique that expedites fulfillment. The overall layout of the fulfillment center provides an efficient layout for item storage, retrieval, and delivery to waiting users. An embodiment adapts these concepts to a drive through grocery fulfillment center. Therefore, a user spends less time and effort in having an order fulfilled. Additionally, because the user does not go into the fulfillment center, the fulfillment center is not as large in size, which decreases the amount of real estate needed to fulfill orders. The requirement for less real estate allows fulfillment centers to be located closer to established, residential areas. Another technical advantage provides the user with a safer environment when picking up an order. Because the user does not have to go into the fulfillment center, the user is not exposed to crime and other elements.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 3 is a flowchart for receiving an order;
and
FIG. 4 is a flowchart for processing and fulfilling the order.

DETAILED DESCRIPTION OF THE DRAWINGS

Embodiments of the present invention and its advantages are best understood by referring to FIGS. 1 through 4, like numerals being used for like and corresponding parts of the various drawings.

Figure 1:
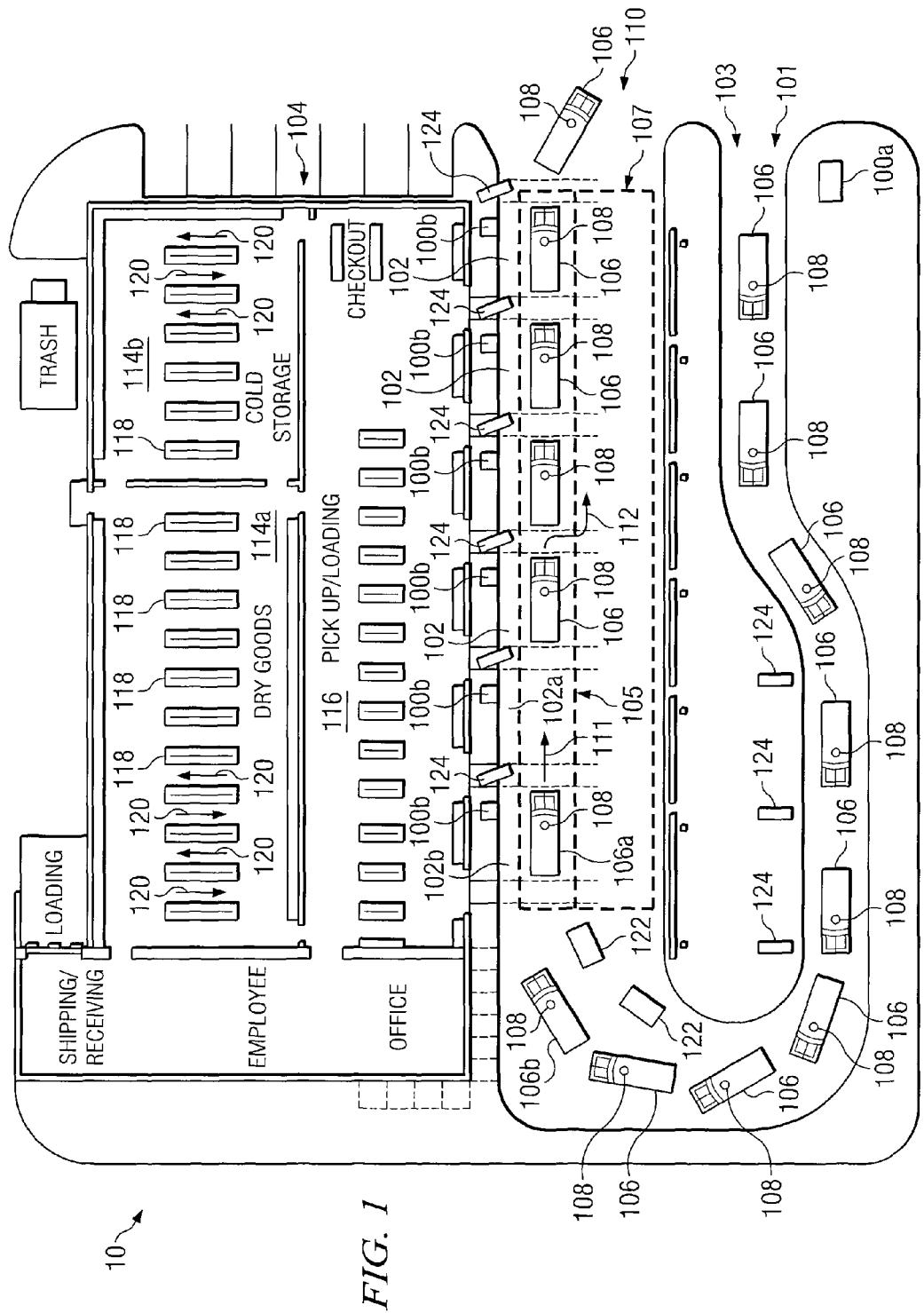
FIG. 1 illustrates a center that fulfills orders.

FIG. 1 illustrates a center 10 that fulfills orders for users 106. Center 10 includes readers 100, delivery locations 102, a queue 103, and a warehouse 104 that provide for order fulfillment. As each user 106 enters queue 103, center 10 initiates fulfillment of an order associated with user 106. Center 10 fulfills orders for any suitable type of items, such as groceries, movies, clothes, or fast-food. Additionally, center 10 adapts to any suitable drive through, such as a fast food drive through, a drive through for prescription fulfillment, or a drive through dry cleaners.

The layout of center 10 further facilitates efficient order fulfillment. User 106 enters center 10 through entrance 101. In an embodiment, center 10 may have a single entrance 101 that accommodates a single user 106 entering at a time. User 106 proceeds to delivery locations 102, within entry lane 105, to receive the order. Delivery locations 102 each accommodate a single user 106. Each delivery location 102 includes a reader 100 that identifies user 106 in the particular delivery location 102. If delivery location 102 is not available, user 106 waits in queue 103. From queue 103, user 106 proceeds to entry lane 105, which extends from queue 103, and enters delivery location 102 to receive the order. User 106 exits center 10 by merging into exit lane 107, which leads user 106 to exit 110. In the illustrated embodiment, queue 103, entry lane 105, and exit lane 107 each have a width that accommodates a single user 106.

User 106 represents a person, a person and an associated vehicle, an identifier, or other instrumentality to interact with center 10 to place and retrieve orders. Also, user 106 may be a delivery service that picks up multiple orders for different customers of the delivery service.

Reader 100 identifies user 106 and identifies the order associated with user 106. Each user 106 includes an identifier 108 that communicates with reader 100. Reader 100 and identifier 108 communicate using any suitable technology, such as radio frequency, infrared, or optical technology. Reader 100 includes any suitable mechanism that recognizes identifier 108 and provides for the association of identifier 108 with stored information, such as a radio frequency identification (RFID) reader, an optical identification reader, a Bluetooth compatible reader, or a camera. Identifier 108 may include an RFID tag, a toll tag, an optical identifier, a Bluetooth compatible device, a license plate, or other suitable identification that allows reader 100 to retrieve information to fulfill the order. For example, user 106 enters center 10 in a vehicle with a license plate. If reader 100 is a camera, the camera reads the license plate to identify user 106. As another example, user 106 enters center 10 in a vehicle that has a toll tag. If reader 100 is an RFID reader, reader 100 recognizes the radio frequency signal of the toll tag and identifies user 106 based on the communication between the toll tag and the RFID reader. As yet another example, user 106 carries an infrared (IR) transmitter that communicates with an IR receiver, allowing the IR receiver to identify user 106.

In particular embodiments, center 10 includes multiple readers 100 to read identifiers 108 at different locations in queue 103 of center 10. Reader 100a first reads identifier 108 near entrance 101 to identify user 106 arriving at center 10. Upon initially reading identifier 108 at reader 100a, center 10 queues items in the order for fulfillment, initiates creation of a new account, and/or recognizes that user 106 has not previously placed an order and would like to place an in-person order. The account information includes a name, a form of payment, or any suitable information that identifies user 106 and facilitates the fulfillment process.

Reader 100b reads identifier 108 a second time to confirm the position of user 106 in a specified delivery location 102. In an embodiment, reader 100b reads identifier 108 a second time when user 106 enters delivery location 102. Orders may include items user 106 desires to receive. For example, center 10 fulfills grocery orders for items such as eggs, milk, and coffee. Orders associated with user 106 may include one or more orders. If the order includes more than one order, center 10 selects the current order user 106 wants to receive or processes orders in a particular sequence. The order may include any suitable information to differentiate between a current order and other orders. For example, each order has an associated pick-up date and time that allows for differentiation between multiple orders.

As mentioned above, when initially reading identifier 108, center 10 may initiate creation of a new account. The creation of a new account occurs if reader 100 does not recognize user 106 or identifier 108, or if user 106 does not have identifier 108. Center 10 creates a new account at any suitable point as user 106 proceeds to delivery location 102. For example, user 106 creates a new account and places an order when user 106 arrives in delivery location 102. As additional examples, an attendant visits user 106 and creates an account and takes the order while user 106 is in queue 103, or center 10 includes one or more stations 122 that allow user 106 to create a new account and place an order. Station 122 includes a monitor, a touchpad, a credit card swipe, a keyboard, a speaker, any suitable component that facilitates account creation and order placement, and/or any suitable combination of the preceding.

Center 10 may also accept an in-person order if center 10 does not have an order stored for user 106. User 106 places the in-person order at delivery location 102, before arriving at delivery location 102, or at any suitable position in center 10. To place the in-person order, user 106 interacts with station 122, an attendant, or other suitable device that provides the order to center 10. In an embodiment, stations 122 associate with delivery location 102 and user 106 places the in-person order at station 122 located at delivery location 102.

After proceeding through the first part of queue 103, user 106 enters into an open delivery location 102 to receive the order. If user 106 is in a vehicle, an attendant may load items from the order into the vehicle while in delivery location 102. Delivery location 102 is of any suitable size that allows user 106 to wait for an order or wait for delivery location 102 closer to exit 110 to become available. Delivery locations 102 may be situated in any suitable manner. For example, delivery locations 102 are parallel, allowing vehicles to pull into delivery locations 102 side-by-side. As another example, delivery locations 102 are at an angle. In the illustrated embodiment, the serially configured delivery locations 102 allow users 106 to remain end-to-end in a single line. Center 10 includes instructional signs and/or notifications to inform users 106 to continue moving forward as delivery locations 102 open, as indicated by arrow 111. In the illustrated embodiment, delivery location 102a is empty. Therefore, user 106a enters into delivery location 102a, and user 106b enters into delivery location 102b. Any suitable configuration of delivery locations 102 provides for parallel processing of the delivery of the orders. Therefore, user 106 may receive an order at the same time other users 106 receive their orders.

Upon receiving items from the order, user 106 proceeds to exit 110. If user 106 is in delivery location 102 that is not directly in front of exit 110, user 106 exits from delivery location 102 as indicated by arrow 112. When user 106 exits delivery location 102, another user 106 directly behind delivery location 102 enters into delivery location 102 or delivery location 102 remains empty. If user 106 is receiving an order when the other delivery location 102 becomes available, user 106 remains in the current delivery location 102. In a particular embodiment, user 106 stays in entry lane 105 and pulls up to occupy empty delivery locations 102 until the order is ready for delivery. Upon receiving the order, user 106 pulls out of delivery location 102 into exit lane 107 and exits center 10 through exit 110. The pull-up in entry lane 105 and pull-out using exit lane 107 ensure efficient delivery of orders while reducing the possibility of congestion or collision.

While in center 10, user 106 views communications 124. Communications include any suitable type of information, such as order status, order notification, or advertisements. For example, communications 124 appear in center 10 if user 106 cannot proceed directly to delivery location 102 but waits in queue 103. As another example, user 106 views communications 124 while waiting in delivery location 102. In an embodiment, communications 124 occupy a portion of delivery location 102 and include generic advertisements, or targeted advertisements based on identifying user 106 by reading identifier 108, and optionally considering past transaction history or other information that profiles user 106. Past transaction history includes the purchasing habits of user 106 to allow tailoring of communications 124 to the preferences of user 106. As another example, center 10 adjusts the amount of time to display communications 124 based on how long user 106 waits in queue 103 or delivery location 102. Communications 124 appear in any suitable manner, such as on a billboard that updates its display, a television, or any interactive display.

Warehouse 104 includes items to fulfill an order of user 106, such as zones 114 and queuing stations 116. Zones 114 include the items to fulfill the order. Zones 114 may be separated based on type, frequency of use, or any suitable characteristic. In the illustrated embodiment, zones 114 are separated based on dry goods 114a and frozen/cold storage 114b. In frozen/cold storage 114b, interior rows 118 include storage for fresh items and produce, and refrigerated and frozen items surround the perimeter of frozen/cold storage 114b. Each zone 114 includes rows 118 that hold the items. The arrangement of rows 118 provides a systematic method to retrieve items to fulfill the order, such as by item type, frequency of use, or any suitable characteristic. In an embodiment, rows 118 allow traffic to move one-way as shown by arrows 120. Therefore, items may be retrieved quickly and easily from rows 118 by warehouse workers, robotic devices, or other suitable automated equipment.

Queuing stations 116 allow attendants to store the retrieved items of an order before user 106 picks up the order. Attendants fill orders based on an arrangement of orders in a queue, the number of attendants available to fill orders, the number of orders being processed, or any suitable determinant to accomplish order fulfillment. For example, if user 106 schedules to pick up an order at 5:00 p.m., an attendant gathers the items in the order at 4:30 p.m. and stores the items at queuing station 116 until user 106 arrives. Therefore, user 106 may receive the order without waiting for the attendant to gather pre-ordered items. Queuing stations 116 may include different areas that allow items in the order to be stored based on type.

For example, if an order includes ice cream and bread, queuing station 116 includes a freezer area to store the ice cream and a shelf to store the bread until user 106 picks up the order. If user 106 places an in-person order, the attendant may not use queuing station 116. Instead, the attendant may gather the items for the in-person order and immediately deliver the items to user 106.

In operation, user 106 enters center 10. Reader 100a detects the location, or presence, of user 106 in center 10 by reading identifier 108 a first time when user 106 enters center 10. User 106 proceeds to delivery location 102 where reader 100b reads identifier 108 a second time to detect the location, or presence, of user 106 at delivery location 102. An attendant provides the order to user 106. User 106 exits center 10 at exit 110 and another user 106 backfills into empty delivery location 102. Using this process, center 10 provides an efficient order fulfillment process that maximizes customer throughput and drastically reduces required square footage.

Modifications, additions, or omissions may be made to center 10. For example, users 106 may not arrive in vehicles to pick up an order from center 10. Instead, user 106 may walk into center 10. User 106 may have identifier 108 that allows reader 100a to detect user 106 in center 10. When user 106 reaches a pick-up area of center 10, another reader 100b detects the location of user 106. Additionally, center 10 may include any number of readers 100, delivery location 102, zones 114, queuing stations 116, and other elements within center 10. The arrangement of entrance 101, queue 103, entry lane 105, exit lane 107, and exit 110 may be configured in any suitable manner to facilitate efficient order fulfillment. Any suitable logic comprising software, hardware, other logic, or any suitable combination of the preceding may perform the functions of any component in center 10.

Figure 2:
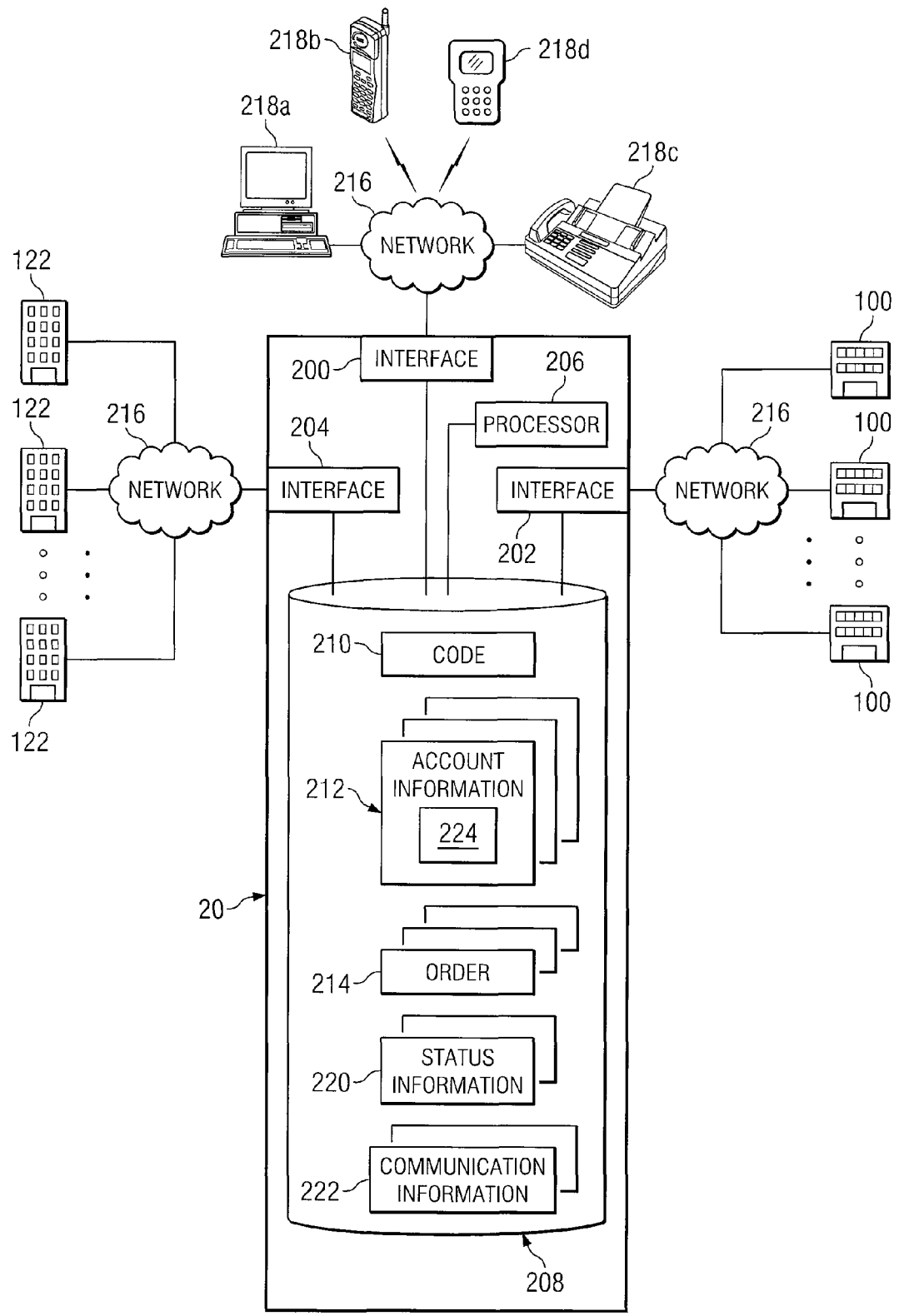
FIG. 2 illustrates a controller for the center.

FIG. 2 illustrates a controller 20 for center 10. In general, controller 20 communicates with users 106 and center 10 to identify and arrange fulfillment of orders. In the illustrated embodiment, controller 20 includes interfaces 200, 202, and 204, a processor 206, and a memory 208.

In the illustrated embodiment, interface 200 communicates with endpoints 218, interface 202 communicates with readers 100, and interface 204 provides for communication with stations 122. Interfaces 200, 202, and 204 represent any port or connection, real or virtual, including any suitable hardware and/or software that allow communication to and from controller 100. In an embodiment, interfaces 200, 202, and 204 are a single interface or multiple interfaces depending on the particular configuration and design of controller 20.

Interfaces 200, 202, and 204 exchange information regarding orders, account information, or other communication through a network 216. For example, network 216 facilitates communication between endpoints 218 and controller 20 through interface 200. Network 216 includes a public switched telephone network (PSTN), a local area network (LAN), a wide area network (WAN), any other public or private data network, a local, regional, or global communication network such as the Internet, an enterprise intranet, other suitable wireline or wireless communication link, or any combination of the preceding. Network 216 may include any combination of gateways, routers, hubs, switches, access points, base stations, and any other hardware and/or software that implements any suitable protocol or communication.

Endpoints 218 and stations 122 allow user 106 to place an order. Endpoints 218 send and receive data signals, audio signals, video signals, any suitable type of information, or any combination of the preceding. For example, endpoints 218 participate in Internet Protocol (IP) based communication. Endpoints 218 include, for example, a telephone, a wireless or cellular telephone, a computer supporting a telephony application, a computer with Internet access, a phone with Internet access, a fax machine, a wireless handheld device, or any other endpoint suitable for communication. In an embodiment, user 106 using endpoint 218a visits the website associated with center 10 to register for service, place orders, and generally mange the account that user 106 maintains with center 10.

Processor 206 controls the operation and administration of controller 20. For example, processor 206 processes information and/or commands received from interfaces 200, 202, and 204 and memory 208. Processor 206 includes any hardware and/or software that operate to control and process information. For example, processor 206 is a microcontroller, a programmable logic device, a microprocessor, any suitable processing device, or any combination or number of the preceding. Additionally, controller 20 may operate to host a Web page on the Internet.

Memory 208 stores, either permanently or temporarily, data and other information accessible by processor 206 and by interfaces 200, 202, and 204. Memory 208 includes any one or a combination of volatile or nonvolatile local or remote devices suitable for storing information. For example, memory 208 includes random access memory (RAM), read only memory (ROM), magnetic storage devices, optical storage devices, or any other suitable information storage device or combination of these devices. Memory 208 stores information in one or more modules. For example, in the illustrated embodiment, memory 208 includes code 210, account information 212, orders 214, status information 220, and communication information 222. While memory 208 as illustrated includes particular data elements, it should be understood that memory 208 maintains any suitable information for use in operation of controller 20.

Code 210 includes software, executable files, Web pages, graphical user interfaces (GUIs) and/or appropriate logic modules capable when executed to control the operation of controller 20. For example, code 210 includes Web pages for presentation to user 106 to manage registrations and order requests. Code 210 also includes executable files capable of processing order requests, in-person orders, user 106 identification, and other functions for center 10. Code 210 includes executable files to gather inputs from readers 100, warehouse sensors, checkout equipment, barcode scanners, or other sensors to provide, organize, and report the status of center 10.

Account information 212 includes information related to each particular user 106. For example, account information 212 includes account balances, user preferences, payment information, user satisfaction scores, or other information specific to the account of user 106. In an embodiment, account information 212 includes past transaction history 224 of user 106. Past transaction history 224 includes past transactions of user 106, purchasing habits of user 106, or any suitable information for analysis of information that allows controller 20 to target communications 124 to the preferences of user 106.

Orders 214 include information about each order 214 that user 106 places. Orders 214 include the items in an order, the time of order pick-up, the location of order pick-up, or other information specific to an order placed by user 106. Orders 214 associate with account information 212. In an embodiment, order 214 includes one or more orders. If each order 214 has an associated time of pick-up, controller 20 determines the current order 214 user 106 desires to receive. Orders 214 may also include a recurring order 214 associated with user 106. For example, if user 106 orders eggs, milk, and bread every week, user 106 may place order 214 once, and configure order 214 to be placed weekly. Therefore, controller 20 may retrieve recurring order 214 to fulfill when user 106 arrives at center 10 instead of receiving a scheduled order 214 or receiving an in-person order 214.

Status information 220 includes information that indicates the presence of user 106 at one of delivery locations 102 within center 10. Such information includes a status on the number of orders 214, speed of delivery, inventory, or any suitable information. Status information 220 updates as user 106 enters different delivery locations 102. Controller 20 updates status information 220 using the input from readers 100.

Communication information 222 includes communications 124 that controller 20 displays within center 10. In an embodiment, communication information 222 provides timing of communications 124, sequence of communications 124, or any suitable information. In another embodiment, communication information 222 includes past transaction history 224.

In operation, controller 20 receives an order request from user 106 using endpoint 218. Controller may receive the request through interface 200 or retrieve the request from a previous order 214. User 106 may also place an in-person order at center 10 using station 122. If user 106 places the order at station 122, controller 20 associates the in-person order with account information 212. In an embodiment, user 106 communicates with station 122 to establish an account and place an in-person order. Controller 20 stores the newly established account information 212 in memory 208 and associates order 214 with account information 212. As user 106 enters center 10, reader 100a identifies user 106 and controller 20 retrieves account information 212 associated with the identified user 106. User 106 proceeds through center 10 until reaching delivery location 102. At delivery location 102, reader 100b reads identifier 108 a second time to determine the location of user 106 when the order is ready for delivery.

Modifications, additions, or omissions may be made to controller 20. For example, memory 208 may include information in addition to code 210, account information 212, and order 214. As another example, controller 20 may include additional interfaces to allow for communication between other elements within center 10. Controller 20 may operate or integrate with operations of other centers 10 to share account information 212, status information 220, communication information 222, or other suitable information. Additionally, any suitable logic, comprising software, hardware, other logic, or any suitable combination of the preceding in any component or location of center 10 may perform the functions of controller 20.

FIG. 3 is a flowchart 30 for receiving order 214. Controller 20 receives order 214 at step 300. Controller 20 receives order 214 from any suitable device, such as a cellular phone, a computer, or a fax machine. At step 302, controller 20 receives pick-up information of order 214. Pick-up information includes the pick-up location, the pick-up time, or any suitable information to allow order 214 to be fulfilled. In a particular embodiment, user 106 places the order through a website that allows an interactive choice of items and menus for selecting a particular center 10 and pick-up time.

Controller 20 determines at step 304 whether user 106 is a previous user. If user 106 is not a previous user, controller 20 receives account information 212 at step 306 to establish an account for user 106 using any suitable process, such as an attendant receiving account information 212 from user 106, or user 106 entering account information 212 into station 122. If user 106 is a previous user, controller 20 retrieves account information 212 of user 106 at step 308. At step 310, controller 20 associates order 214 with account information 212 after receiving newly established account information 212 or after retrieving account information 212. Controller 20 stores order 214 at step 312. At step 314, controller 20 processes payment for the order by completing a credit card transaction, a charge card transaction, a debit card transaction, a check transaction, or any suitable financial transaction to complete payment. Controller 20 delivers order 214 to warehouse 104 at step 316 for fulfillment. Any suitable device displays order 214 in center 10 using a print-out, screens in warehouse 104, or handheld scanners.

Modifications, additions, or omissions may be made to flowchart 30. For example, any suitable component may perform any or all the steps performed by controller 20. As another example, flowchart 30 may accommodate multiple orders 214 by user 106. Controller 20 may determine whether user 106 wants to place another order 214 after storing a first order 214 at step 312. Although described in a particular sequence, flowchart 30 may perform steps serially or in parallel in any order.

FIG. 4 is a flowchart 40 for processing and fulfilling order 214. At step 400, controller detects user 106 entering center 10. For example, reader 100a reads identifier 108 when user 106 enters queue 103. Controller 20 determines whether it recognizes identifier 108 at step 402. If controller 20 does not recognize identifier 108, user 106 establishes an account at step 404. To establish an account, user 106 provides a name, an address, credit card information, or other suitable information to allow controller 20 to create an account for user 106 and to allow center 10 to fulfill orders for user 106. User 106 may establish the account using station 122, giving the information to an attendant, transmitting the information to controller 20 using a wireless device, or using any suitable technique.

When user 106 has established an account or controller 20 recognizes identifier 108, controller 20 determines at step 406 whether user 106 has placed order 214. If user 106 has not placed order 214, user 106 places an in-person order 214 at step 408. User 106 places an in-person order 214 at center 10 using station 122, giving an attendant order 214, transmitting order 214 to controller 20 using a wireless device, or using any other suitable technique. User 106 enters an available delivery location 102. Controller 20 detects user 106 in delivery location 102 at step 410. In an embodiment, controller 20 detects user 106 multiple times as user 106 moves through multiple delivery locations 102.

Controller 20 presents communications 124 to user 106 at step 412. In an embodiment, past transaction history 224 associated with user 106 affects the type of communications 124 displayed. Controller 20 determines whether the delivery of order 214 has occurred. If user 106 does not receive order 214 at step 414, controller 20 detects user 106 in a particular delivery location 102. For example, user 106 may enter into an available delivery location 102 closer to exit 110 before receiving order 214. If user 106 cannot enter into a closer delivery location 102, user 106 continues to wait for the delivery of order 214 without moving to a different delivery location 102. If the order is delivered at step 414, controller 20 updates the order history and the method subsequently ends.

Modifications, additions, or omissions may be made to flowchart 40. For example, any suitable component may perform any or all the steps performed by controller 20. As another example, flowchart 40 may accommodate multiple orders 214 from user 106. In addition to the steps as described above, controller 20 may determine the current order 214 to fulfill of multiple orders 214 associated with an account.

Although described in a particular sequence, flowchart 40 may perform steps serially or in parallel in any order.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for fulfilling an order, comprising:
   receiving an order, by a fulfillment center, for a plurality of items;
   initiating, by a processor, collection of the plurality of items for the order;
   detecting, at the fulfillment center with a reader device, presence of a user in a vehicle at a first delivery location of a plurality of locations situated along a drive through lane at the fulfillment center when the plurality of items are not ready for delivery;
   retrieving, by the processor, the user's past transaction history at the fulfillment center, wherein the past transaction history is retrieved after receiving the order and after automatically detecting the presence of the user at the first delivery location at the fulfillment center;
   presenting advertisements to the user with a display device at the first delivery location along the drive through lane based on the retrieved past transaction history of the user at the fulfillment center;
   after detecting presence and presenting advertisements to the user at the first delivery location, detecting presence of the user at a second delivery location of the plurality of locations at the fulfillment center, wherein the second delivery location is situated along the drive through lane at a point distinct from the first location;
   in response to detecting presence of the user at the second delivery location and prior to fulfilling the order for the plurality of items, presenting advertisements to the user at the second delivery location of the plurality of locations along the drive through lane at the fulfillment center based on the retrieved past transaction history of the user at the fulfillment center, wherein the plurality of items are ready for delivery to the user while the user is at the second delivery location; and
   initiating delivery of the items to the user at one of the plurality of locations.

2. The method of claim 1, wherein steps are performed at a fulfillment center and further comprising detecting presence of the user at the fulfillment center before detecting presence of the user at any delivery location of the plurality of locations.

3. The method of claim 2, wherein initiating the collection of the plurality of items for the order occurs after detecting the presence of the user at the fulfillment center.

4. The method of claim 1, wherein receiving an order for a plurality of items comprises a selected one of:
   receiving a scheduled order from the user before the user arrives at a fulfillment center;
   receiving an in-person order at the fulfillment center from the user; or
   retrieving a recurring order associated with the user.

5. The method of claim 1, wherein the plurality of items is grocery items, and further comprising:
   collecting first items of the plurality of items from a non-refrigerated region;
   collecting second items of the plurality of items from a refrigerated region; and
   storing the plurality of items as a completed order in a queuing station to await delivery to the user, wherein the queuing station comprises temporary non-refrigerated storage for the first items and temporary refrigerated storage for the second items.

6. The method of claim 1, wherein prior to receiving an order, the method further comprises:
   reading an identifier associated with the user; and
   if the identifier is not associated with an existing account, establishing a new account for the user.

7. The method of claim 6, wherein the identifier is a radio frequency tag associated with a vehicle operated by the user.

8. The method of claim 1, wherein the user is a customer associated with the order, and detecting presence of the user comprises reading a radio frequency tag associated with a vehicle operated by the user.

9. The method of claim 1, wherein detecting presence of the user comprises:
   detecting presence of the user at the first delivery location using a first reader; and
   detecting, after the user has moved from the first delivery location, presence of the user at a second delivery location using a second reader.

10. The method of claim 1, further comprising:
    detecting that the user is not present at a selected delivery location; and
    indicating that the order has been fulfilled.

11. The method of claim 1, wherein the user moves through the fulfillment center in the vehicle along a drive though lane that includes the first delivery location and the second delivery location, and the user is not required to leave the vehicle before departing the fulfillment center.

12. A non-transitory computer readable medium including logic, the logic, when executed by a processor, operable to perform the following steps:
    receive an order, by a fulfillment center, for a plurality of items;
    initiate collection of the plurality of items for the order;
    detect, at the fulfillment center with a reader device, presence of a user in a vehicle at a first delivery location of a plurality of locations situated along a drive through lane at the fulfillment center when the plurality of items are not ready for delivery;
    retrieve the user's past transaction history at the fulfillment center, wherein the past transaction history is retrieved after receiving the order and after automatically detecting the presence of the user at the first delivery location at the fulfillment center;
    present advertisements to the user with a display device at the first delivery location along the drive through lane based on the retrieved past transaction history of the user at the fulfillment center;
    after detecting presence and presenting advertisements to the user at the first delivery location, detect presence of the user at a second delivery location of the plurality of locations at the fulfillment center, wherein the second delivery location is situated along the drive through lane at a point distinct from the first location;
    in response to detecting presence of the user at the second delivery location and prior to fulfilling the order for the plurality of items, present advertisements to the user at the second delivery location of the plurality of locations at the fulfillment center along the drive through lane based on the retrieved past transaction history of the user at the fulfillment center, wherein the plurality of items are ready for delivery to the user while the user is at the second delivery location; and initiate delivery of the items to the user at one of the plurality of locations.

13. The computer readable medium of claim 12, the logic further operable to detect presence of the user at the fulfillment center before detecting presence of the user at any delivery location of the plurality of locations.

14. The computer readable medium of claim 13, wherein initiating the collection of the plurality of items for the order occurs after detecting the presence of the user at the fulfillment center.

15. The computer readable medium of claim 12, wherein receiving an order for a plurality of items comprises the logic further operable to:
   receive a scheduled order from the user before the user arrives at a fulfillment center;
   receive an in-person order at the fulfillment center from the user; or
   retrieve a recurring order associated with the user.

16. The computer readable medium of claim 12, wherein the plurality of items is grocery items, and the logic further operable to:
   collect first items of the plurality of items from a non-refrigerated region;
   collect second items of the plurality of items from a refrigerated region; and
   store the plurality of items as a completed order in a queuing station to await delivery to the user, wherein the queuing station comprises temporary non-refrigerated storage for the first items and temporary refrigerated storage for the second items.

17. The computer readable medium of claim 12, wherein prior to receiving an order, the logic further operable to:
   read an identifier associated with the user; and
   if the identifier is not associated with an existing account, establish a new account for the user.

18. The computer readable medium of claim 17, wherein the identifier is a radio frequency tag associated with a vehicle operated by the user.

19. The computer readable medium of claim 12, wherein the user is a user associated with the order, and detecting presence of the user comprises the logic further operable to read a radio frequency tag associated with a vehicle operated by the user.

20. The computer readable medium of claim 12, wherein detecting presence of the user, the logic further operable to:
   detect presence of the user at a first delivery location using a first reader; and
   detect, after the user has moved from the first delivery location, presence of the user at the second delivery location using a second reader.

21. The computer readable medium of claim 12, the logic further operable to:
   detect that the user is not present at the selected delivery location; and
   indicate that the order has been fulfilled.

22. A system fulfilling an order, comprising:
   means for receiving an order, by a fulfillment center, for a plurality of items;
   means for initiating collection of the plurality of items for the order;
   means for detecting, at the fulfillment center, presence of a user in a vehicle at a first delivery locations of a plurality of locations situated along a drive through lane at the fulfillment center when the plurality of items are not ready for delivery;
   means for retrieving the user's past transaction history at the fulfillment center, wherein the past transaction history is retrieved after receiving the order and after automatically detecting the presence of the user at the first delivery location at the fulfillment center;
   means for presenting advertisements to the user at the first delivery location along the drive through lane based on the retrieved past transaction history of the user at the fulfillment center;
   after detecting presence and presenting advertisements to the user at the first delivery location, means for detecting presence of the user at a second delivery location of the plurality of locations at the fulfillment center, wherein the second delivery location is situated along the drive through lane at a point distinct from the first location; and
   means for presenting advertisements to the user at the second delivery location of the plurality of locations along the drive through lane at the fulfillment center based on the retrieved past transaction history of the user at the fulfillment center in response to detecting presence of the user at the second delivery location and prior to fulfilling the order for the plurality of items, wherein the plurality of items are ready for delivery to the user while the user is at the second delivery location.

* * * * *